(12) United States Patent
Sugiyama et al.

(10) Patent No.: US 8,988,826 B2
(45) Date of Patent: Mar. 24, 2015

(54) MAMR HEAD WITH A MULTI-LAYERED SIDE GAP FOR STABLE OSCILLATION OF THE STO

(71) Applicant: HGST Netherlands B.V., Amsterdam (NL)

(72) Inventors: Mikito Sugiyama, Odawara (JP); Masato Shiimoto, Odawara (JP); Keiichi Nagasaka, Isehara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/723,010

(22) Filed: Dec. 20, 2012

(65) Prior Publication Data

US 2014/0177100 A1    Jun. 26, 2014

(51) Int. Cl.
*G11B 5/127* (2006.01)
*G11B 5/147* (2006.01)
*G11B 5/31* (2006.01)
*G11B 5/00* (2006.01)

(52) U.S. Cl.
CPC ............ *G11B 5/1278* (2013.01); *G11B 5/3116* (2013.01); *G11B 2005/0024* (2013.01)
USPC .............. 360/125.31; 360/125.08; 360/125.12

(58) Field of Classification Search
CPC ............................................... G11B 2005/0024
USPC ............... 360/125.08, 125.12, 125.3, 125.31, 360/125.71–125.74
See application file for complete search history.

(56) References Cited

U.S. PATENT DOCUMENTS

| 7,957,098 | B2 | 6/2011 | Yamada et al. |
| 8,027,118 | B2 | 9/2011 | Ezawa et al. |
| 8,107,352 | B1 * | 1/2012 | Yamanaka et al. ........ 369/112.27 |
| 2006/0198049 | A1 * | 9/2006 | Sasaki et al. .................. 360/126 |

(Continued)

FOREIGN PATENT DOCUMENTS

| JP | 2005025831 | 1/2005 |
| JP | 2010-020857 A | 1/2010 |
| JP | 2010-113764 A | 5/2010 |

OTHER PUBLICATIONS

Wang et al., "Media damping constant and performance characteristics in microwave assisted magnetic recording with circular as field," Journal of Applied Physics, vol. 105, 2009, pp. 07B902 (abstract only).

(Continued)

*Primary Examiner* — Adam B Dravininkas
(74) *Attorney, Agent, or Firm* — Zilka-Kotab, PC

(57) ABSTRACT

A microwave-assisted magnetic recording (MAMR) head according to one embodiment includes a main pole; a trailing shield positioned downstream from the main pole; an oscillation device adapted to generate a high-frequency magnetic field, the oscillation device being positioned between the main pole and the trailing shield; a circuit adapted to flow an electric current therethrough to the main pole, the oscillation device, and the trailing shield; an electrically conductive non-magnetic body positioned on one or more sides of the main pole in a cross-track direction and/or a leading direction; and an insulating non-magnetic body positioned on one or more sides of the electrically conductive non-magnetic body in the cross-track direction and/or the leading direction, wherein one or more edge portions of one side of the oscillation device and one or more edge portions of one side of the main pole are in direct contact with the electrically conductive non-magnetic body.

13 Claims, 17 Drawing Sheets

(56) References Cited

U.S. PATENT DOCUMENTS

| | | |
|---|---|---|
| 2009/0080120 A1* | 3/2009 | Funayama et al. ............ 360/319 |
| 2010/0110592 A1 | 5/2010 | Koui et al. |
| 2010/0142088 A1 | 6/2010 | Iwasaki et al. |
| 2011/0255197 A1 | 10/2011 | Tsuchiya et al. |
| 2011/0279921 A1 | 11/2011 | Zhang et al. |
| 2012/0069465 A1 | 3/2012 | Sato et al. |
| 2012/0113542 A1 | 5/2012 | Igarashi et al. |
| 2013/0028058 A1* | 1/2013 | Yasui et al. ................ 369/13.14 |
| 2013/0057980 A1* | 3/2013 | Shiimoto et al. .............. 360/110 |
| 2013/0063837 A1* | 3/2013 | Udo et al. ...................... 360/75 |

OTHER PUBLICATIONS

Zhu et al., "Microwave Assisted Magnetic Recording," IEEE Transactions on Magnetics, vol. 44, No. 1, Jan. 2008, pp. 125-131 (abstract only).

\* cited by examiner

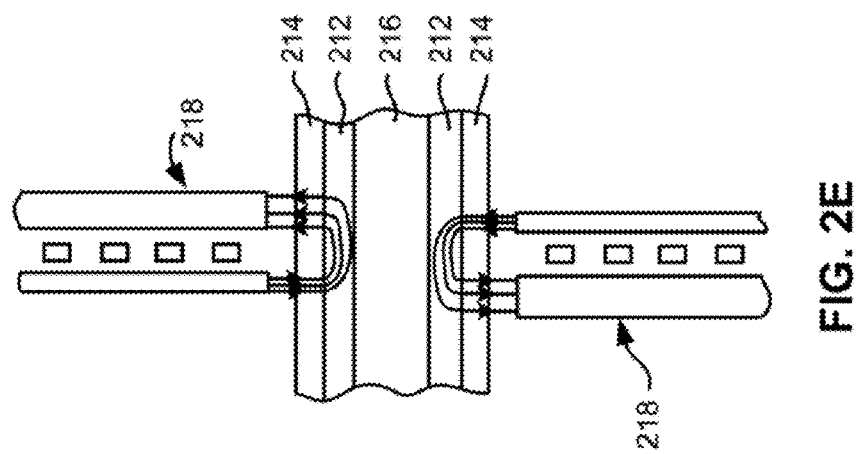
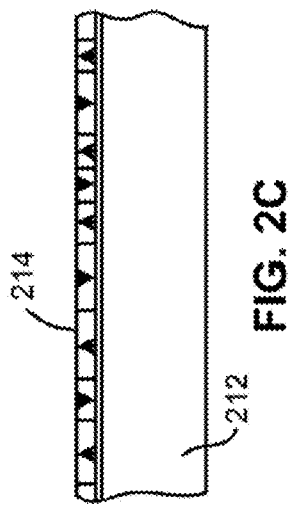
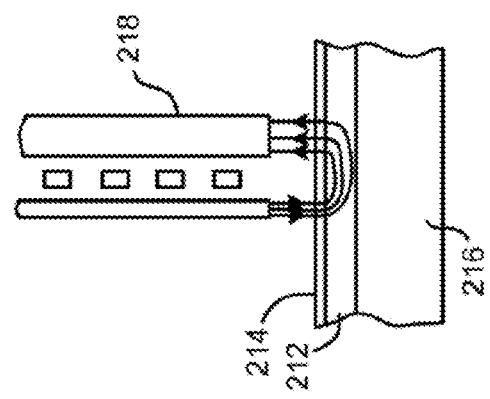
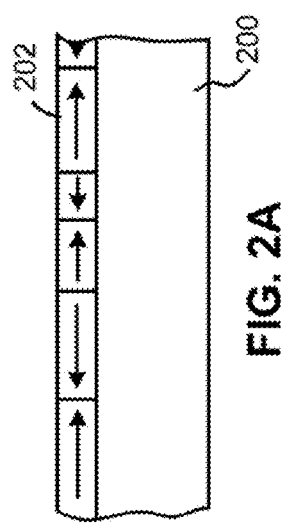
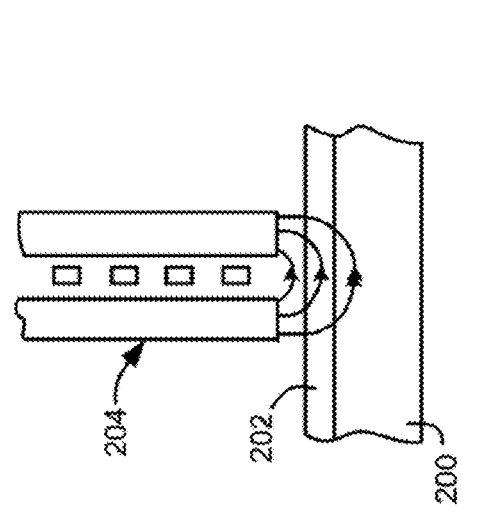

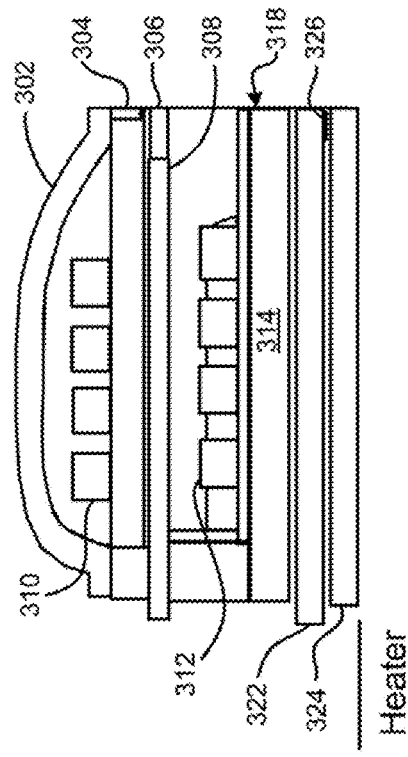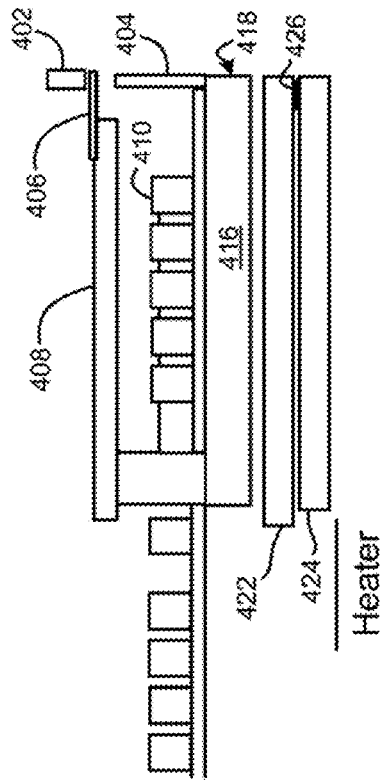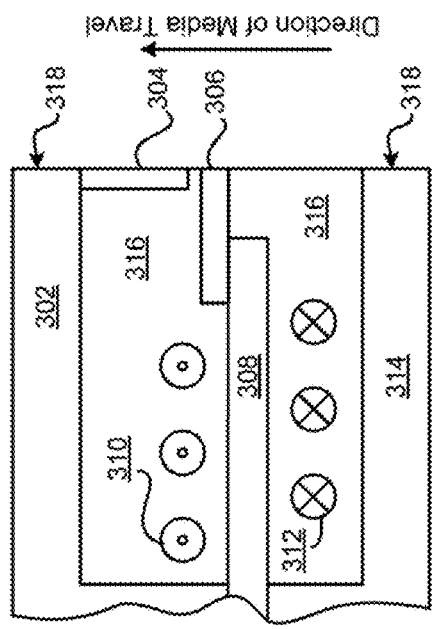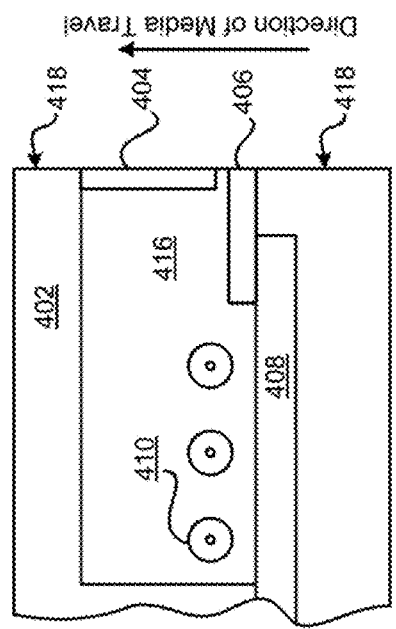

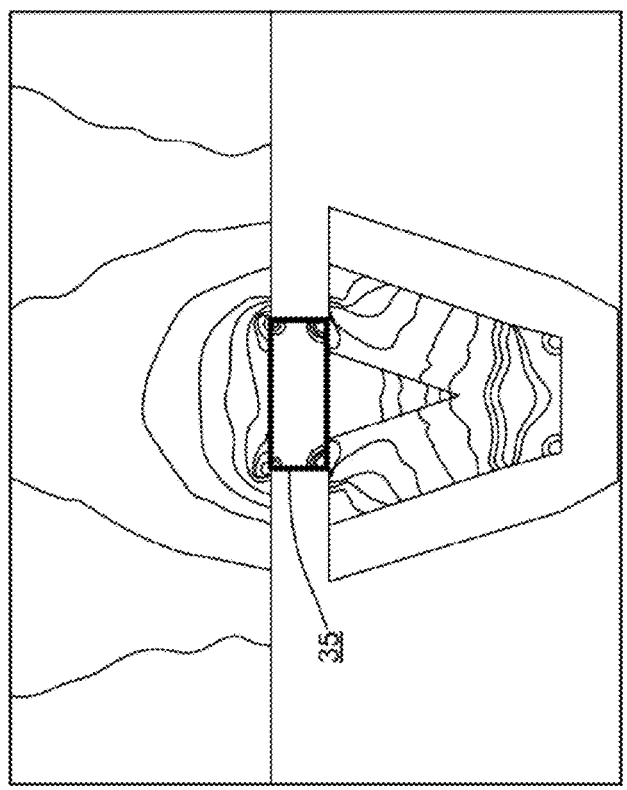
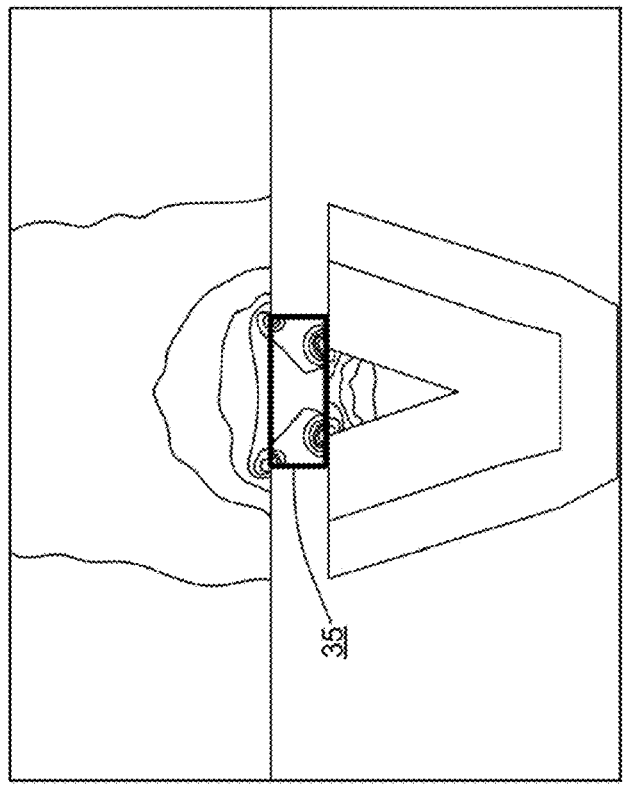
FIG. 8A
FIG. 8B

MAMR HEAD WITH A MULTI-LAYERED SIDE GAP FOR STABLE OSCILLATION OF THE STO

FIELD OF THE INVENTION

The present invention relates to data storage systems, and more particularly, this invention relates to a microwave-assisted magnetic recording head that has a multi-layered side gap for producing stable oscillation of the spin torque oscillator.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. The development of microwave-assisted magnetic recording (MAMR) systems for enhancing the surface density of magnetic recording media has benefited higher density recording. In MAMR, information is recorded as a result of application of a high-frequency magnetic field of a strong microwave band across a nanometer-order region to locally excite the recording medium within this region and reduce the magnetization-reversing magnetic field. In order to achieve an adequate reduction in the magnetization-reversing magnetic field for utilizing the magnetic resonance, a magnetic field of a proportionally higher frequency than the anisotropy magnetic field of the recording medium is used.

Japanese Laid-Open Patent Application No. 2005-025831 discloses a high-frequency oscillator, which in this reference is a spin torque oscillator (STO) of a structure in which, in order to generate a high frequency-assisted magnetic field, a laminated film of a structure that resembles a giant magnetoresistance (GMR) device. STOs are able to generate a minute high-frequency vibrating magnetic field by injecting conduction electrons with spin fluctuations generated by a GMR structure into a magnetic body by way of a non-magnetic body. A technique in which a spin torque-based high-speed rotating high-frequency magnetic field generating layer is arranged adjacent to a main pole of a perpendicular magnetic head to generate microwaves (high-frequency magnetic field) is described in "Microwave Assisted Magnetic Recording" J-G. Zhu, et al., IEEE Trans. Magn., Vol. 44, No. 1, pp. 125 (2008). This reference also discloses that information is recorded on a magnetic recording medium of high magnetic anisotropy. Furthermore, "Medium damping constant and performance characteristics in microwave assisted magnetic recording with circular as field," Y. Wang, et al., Journal of Applied Physics, Vol. 105, pp. 07B902 (2009), discloses a technique in which the magnetization reversal of a magnetic recording medium is efficiently assisted by the arrangement of an STO between the main pole of the magnetic recording head and the trailing shield rearward of the main pole, along with a change in the rotating direction of the high-frequency magnetic field in response to the polarity of the recording magnetic field.

In MAMR heads that comprise a STO, an electric current must flow to the STO. As is disclosed in "Medium damping constant and performance characteristics in microwave assisted magnetic recording with circular as field," Y. Wang, et al., Journal of Applied Physics, Vol. 105, pp. 07B902 (2009), when an STO is arranged between the main pole and the trailing shield, the main pole and the trailing shield serve the additional role of electrodes. An inherent problem in terms of the practicality of such a structure pertains to the difficulty associated with positioning the STO and the main pole, which have widths on the order of several 10's of nanometers. Positioning displacement of these layers gives rise to the possibility of disruption to the uniformity of the electric current applied to the STO, and to obstruction of stable oscillation of the STO. Accordingly, while the width of the STO must be less than that of the main pole, there are limits thereto in terms of improving the high-frequency magnetic field intensity.

Therefore, it would be beneficial to have a MAMR system having a high-frequency magnetic field-assisted magnetic recording head that is capable of stably producing a high oscillation frequency and assisted magnetic field intensity, irrespective of variations in the STO width and a relative positional relationship between the STO and the main pole produced during the manufacturing process. In this way, the surface recording density and ease of manufacturing and manufacturing yield would be able to be improved.

SUMMARY

A microwave-assisted magnetic recording (MAMR) head according to one embodiment includes a main pole comprising a magnetic body adapted to generate a magnetic field for recording data on a magnetic recording medium; a trailing shield positioned downstream from the main pole in a direction in which the magnetic recording medium advances; an oscillation device adapted to generate a high-frequency magnetic field, the oscillation device being positioned between the main pole and the trailing shield; a circuit adapted to flow an electric current therethrough to the main pole, the oscillation device, and the trailing shield; an electrically conductive non-magnetic body positioned on one or more sides of the main pole in a cross-track direction and/or a leading direction, and an insulating non-magnetic body positioned on one or more sides of the electrically conductive non-magnetic body in the cross-track direction and/or the leading direction, wherein one or more edge portions of one side of the oscillation device and one or more edge portions of one side of the main pole are in direct contact with the electrically conductive non-magnetic body.

A microwave-assisted magnetic recording (MAMR) head according to another embodiment includes a main pole adapted to generate a magnetic field for recording data on a magnetic recording medium; a trailing shield positioned downstream from the main pole in a direction in which the magnetic recording medium advances; a spin torque oscillator (STO) adapted to generate a high-frequency magnetic field, the STO being positioned between the main pole and the trailing shield; an electrically conductive non-magnetic body positioned on one or more sides of the main pole in a cross-track direction and/or a leading direction; and an insulating non-magnetic body positioned on one or more sides of the electrically conductive non-magnetic body in the cross-track direction and/or the leading direction, wherein one or more edge portions of one side of the STO and one or more edge portions of one side of the main pole are in direct contact with the electrically conductive non-magnetic body.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIG. 8A profiles a current density distribution calculated by the finite element method of a conventional STO.

FIG. 8B profiles a current density distribution calculated by the finite element method of a STO according to one embodiment.

DETAILED DESCRIPTION

Figure 1:
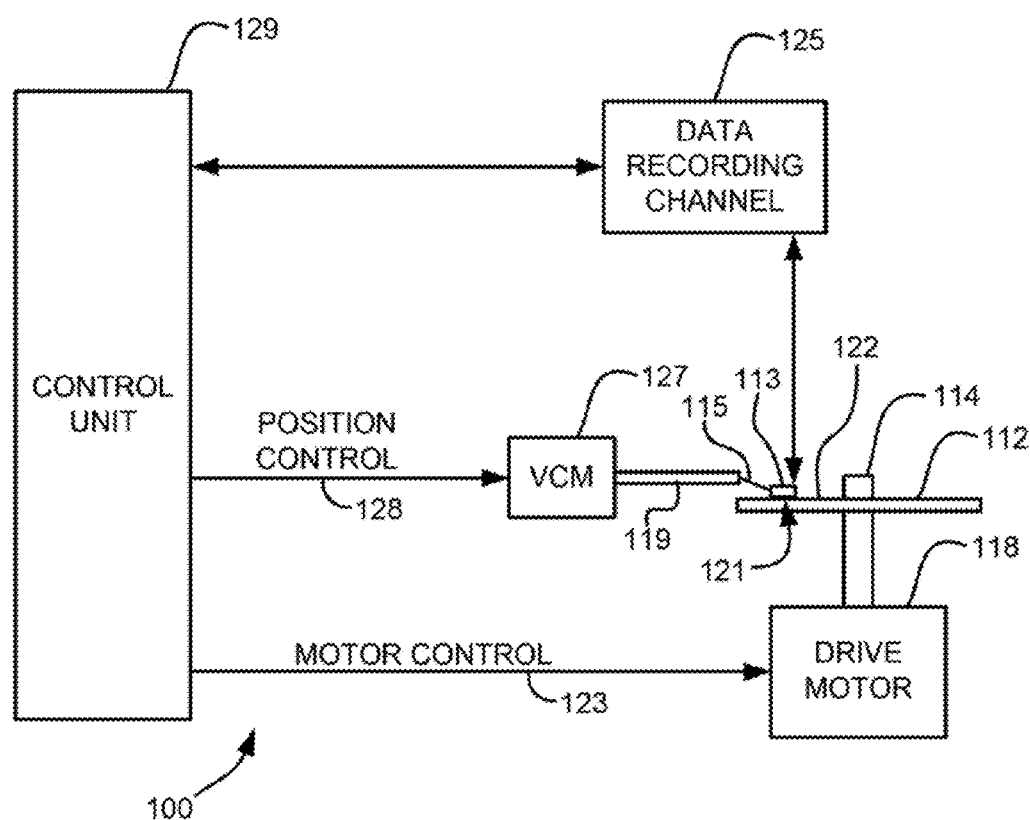
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a microwave-assisted magnetic recording (MAMR) head includes a main pole comprising a magnetic body adapted to generate a magnetic field for recording data on a magnetic recording medium; a trailing shield positioned downstream from the main pole in a direction in which the magnetic recording medium advances; an oscillation device adapted to generate a high-frequency magnetic field, the oscillation device being positioned between the main pole and the trailing shield; a circuit adapted to flow an electric current therethrough to the main pole, the oscillation device, and the trailing shield; an electrically conductive non-magnetic body positioned on one or more sides of the main pole in a cross-track direction and/or a leading direction; and an insulating non-magnetic body positioned on one or more sides of the electrically conductive non-magnetic body in the cross-track direction and/or the leading direction, wherein one or more edge portions of one side of the oscillation device and one or more edge portions of one side of the main pole are in direct contact with the electrically conductive non-magnetic body.

In another general embodiment, a microwave-assisted magnetic recording (MAMR) head includes a main pole adapted to generate a magnetic field for recording data on a magnetic recording medium; a trailing shield positioned downstream from the main pole in a direction in which the magnetic recording medium advances; a spin torque oscillator (STO) adapted to generate a high-frequency magnetic field, the STO being positioned between the main pole and the trailing shield; an electrically conductive non-magnetic body positioned on one or more sides of the main pole in a cross-track direction and/or a leading direction; and an insulating non-magnetic body positioned on one or more sides of the electrically conductive non-magnetic body in the cross-track direction and/or the leading direction, wherein one or more edge portions of one side of the STO and one or more edge portions of one side of the main pole are in direct contact with the electrically conductive non-magnetic body.

Referring now to FIG. 1, there is shown a magnetic data storage system, e.g., a disk drive 100, in accordance with one embodiment of the present invention. As shown in FIG. 1, at least one magnetic medium, e.g. a rotatable magnetic disk 112, is supported on a spindle 114 and rotated by a drive mechanism, which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 (write coils) are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (heater) may also be included in the magnetic heads shown in FIGS. 3A and 4A. The position of this heater may vary based on design parameters such as where the protrusion is desired, coefficients of thermal expansion of the surrounding layers, etc.

Figure 5:
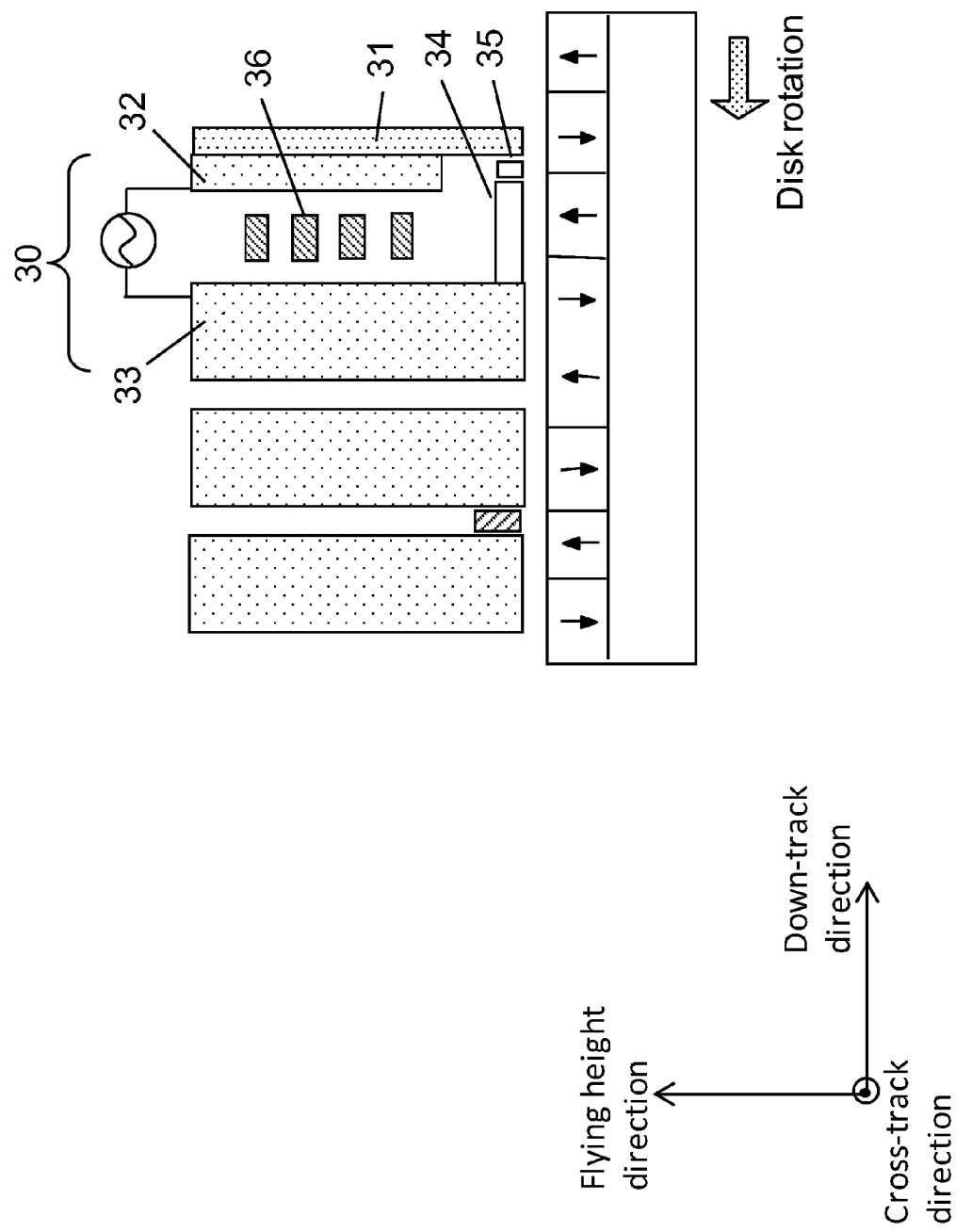
FIG. 5 is a schematic diagram of a microwave-assisted magnetic recording (MAMR)-type perpendicular magnetic recording head, according to one embodiment.

In FIG. 5, schematically shows a configuration of a structure according to one embodiment. As shown, a recording head 30 comprises a main pole 31, a trailing shield 34, a sub-pole 33, an auxiliary magnetic pole 32, and a coil 36. A spin torque oscillator (STO) 35 is provided between the main pole 31 and the trailing shield 34.

Figure 6B:
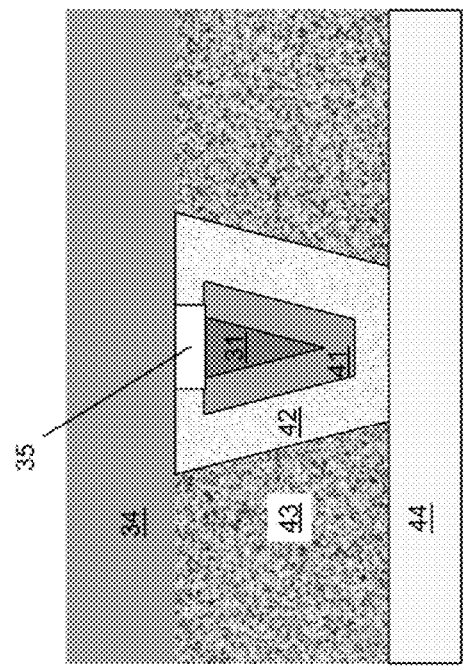
FIGS. 6A-6B show a schematic diagram of an MAMR-type perpendicular magnetic recording head in a vicinity of the air bearing surface (ABS) thereof, according to one embodiment.
Figure 6A:
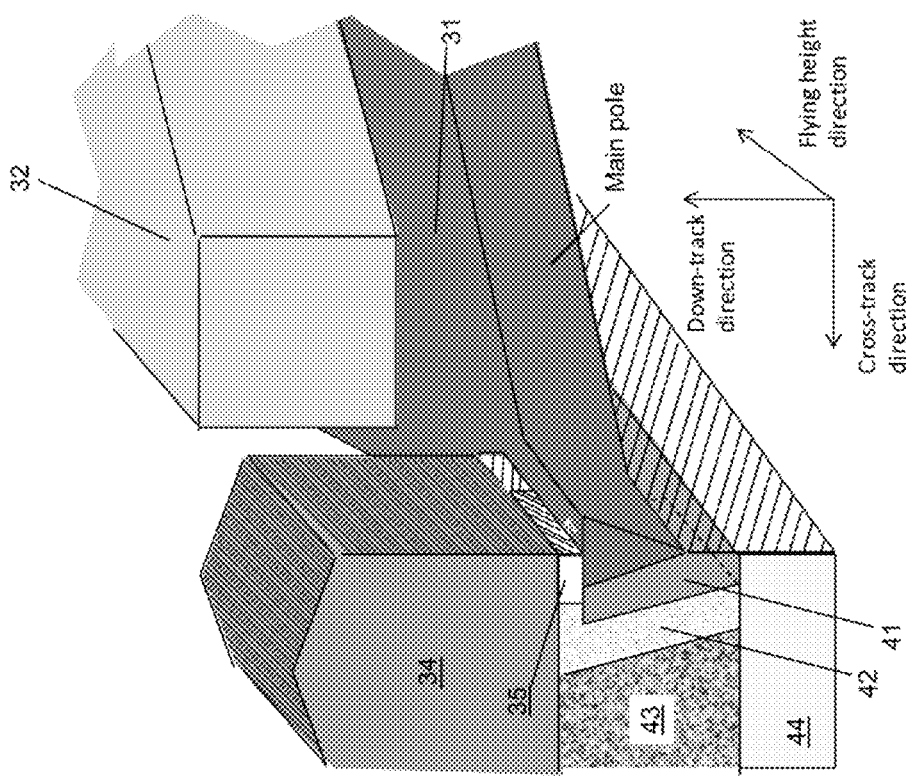

FIGS. 6A-6B show an expanded view of the main pole leading edge, according to one embodiment. FIG. 6A shows a perspective view, while FIG. 6B shows an ABS view. The main pole 31 is formed on a non-magnetic body comprising any suitable material, such as $Al_2O_3$, NiCr, etc. In this case, a structure which is provided with a side shield 43 from the standpoint of adjacent track degaussing will be described. As will be described later with reference to some embodiments, the same effects are able to be achieved using structures that do not comprise a side shield 43. FIG. 6A shows, apart from the main pole 31 and the auxiliary magnetic pole 32, just one side of the track center portion of the structure. The main pole 31 and side shield 43 comprise magnetic metals, such as Fe, Co, Ni, etc. Non-magnetic bodies (41, 42) of a fixed thickness are provided between the main pole 31 and the side shield 43 to provide magnetic insulation. These non-magnetic bodies (41, 42) comprise at least two non-magnetic layers laminated to extend along a side face of the main pole 31. At this time, the layer adjacent to the main pole 31 (hereinafter the metal-side gap layer 41) serves as the non-magnetic metal layer, and the layer at the peripheral portion thereof not in contact with the main pole 31 (hereinafter the insulating body-side gap layer 42) serves as a non-magnetic insulating body. NiCr, Ru, Ta, Cu, Au, and the like may be employed as the metal-side gap layer 41. In addition, $Al_2O_3$ (or alumina), a complex oxide containing the same, or a diamond-like carbon (DLC) may be employed in the insulating body-side gap layer 42. The STO 35 is characterized in that it is provided between the main pole 31 and the trailing shield 43, and in that at least one of the edge portions thereof in a cross-track direction lies between the main pole edge portion and the aforementioned non-magnetic layer outer circumferential portion.

Figure 7B:
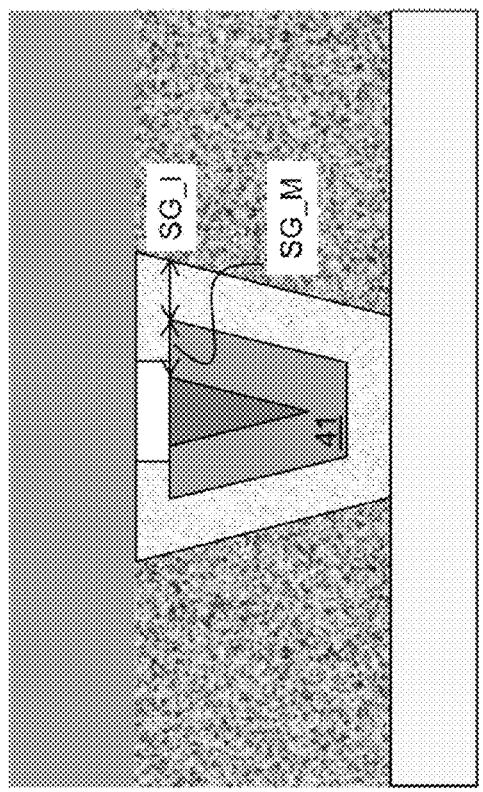
FIG. 7B schematically shows a structure, according to one embodiment, used in the finite element method current density calculation.
Figure 7A:
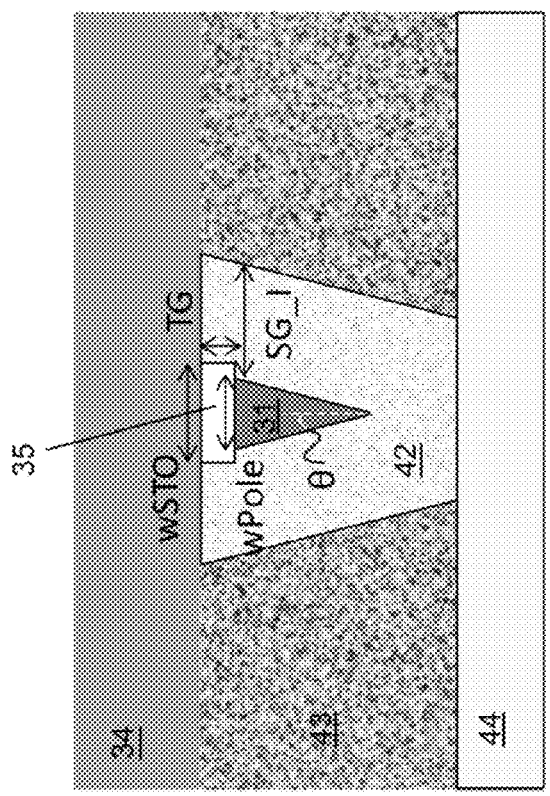
FIG. 7A schematically shows a conventional structure used in a finite element method current density calculation.

Results obtained for a current density distribution in a STO according to one embodiment using a finite element method (FEM) calculation are disclosed. FIGS. 7A-7B are schematic diagrams of the models employed in this calculation. FIG. 7A shows a conventional structure having a main pole 31, a STO 35, a trailing shield 34, a side gap 42 and a side shield 43. The dimensions of each component are provided in Table 1, below, with lengths being in nm, and θ being an angle.

TABLE 1

|   | wPole | wSTO | SG_I | SG_M | TG | θ |
|---|-------|------|------|------|----|----|
| A | 50 | 80 | 80 | 0 | 20 | 15 |
| B | 50 | 80 | 30 | 50 | 20 | 15 |

The side gap 42 comprises an insulating body for which, in this case, the use of $Al_2O_3$ (or alumina) which is widely employed in magnetic recording heads and which has a specific resistance of about $1\times10^{14}$ may be used. FeCo which is a typical magnetic material and which has a specific resistance of about $5\times10^{-8}$ may be employed for the main pole 31, the trailing shield 34 and the side shield 43. In addition, the use of a common GMR device as the STO 35 with a specific resistance of about $3 \times 10^{-5}$ may be used. On the other hand, in the structure shown in FIG. 7B, the region adjacent to the main pole 31 of the side gap 42 between the main pole 31 and side shield 43 comprises a non-magnetic metal layer 41. Here, the non-magnetic metal layer 41 may comprise Ru with a specific resistance of about $7.7 \times 10^{-8}$ or some other suitable non-magnetic metal material known in the art. The remaining construction of the structure in FIG. 7B is similar to that in FIG. 7A, e.g., a conventional structure.

In both models, an assumption is made that the trailing shield has a potential of zero and that the potential difference between the main pole 31 and the trailing shield 34 is 0.2 V.

FIGS. 8A-8B show the current distribution as determined by an FEM calculation. FIG. 8A shows the current distribution for a conventional structure as shown in FIG. 7A. FIG. 8B shows the current distribution for a structure according to one embodiment, as shown in FIG. 7B. Referring again to FIGS. 8A-8B, looking at the STO 35 section, it is clear that in the conventional structure, a region in which the electric current is concentrated exists in close proximity to the edge portion of the main pole. On the other hand, in the structure according to one embodiment, the current is concentrated in the edge portion of the STO.

Figure 9:
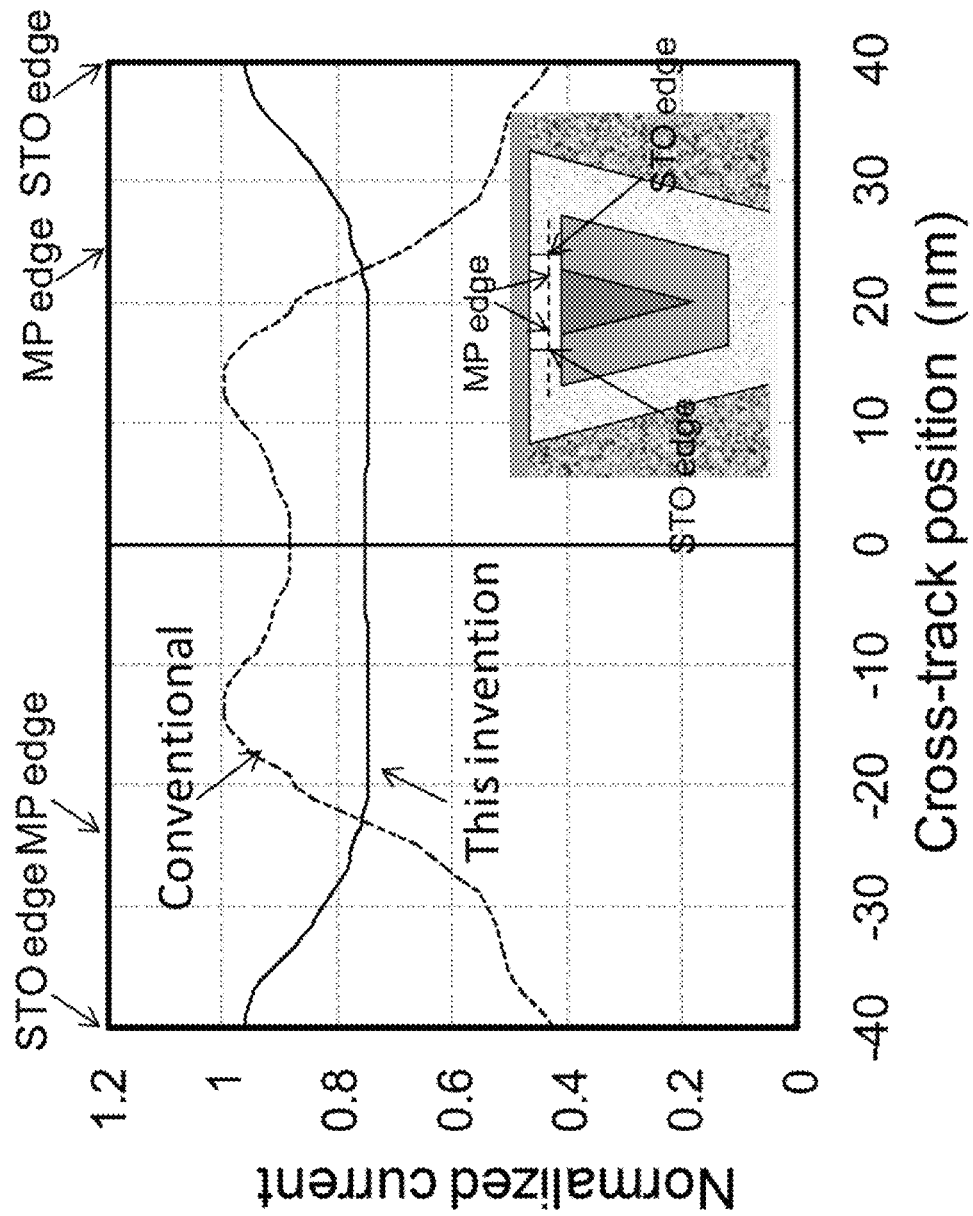
FIG. 9 is a plot profiling a current density in a cross-track direction of a center portion of a conventional STO compared to a STO according to one embodiment.

FIG. 9 shows a current density distribution in a cross-track direction in the center section of the STO device for a conventional structure as shown in FIG. 7A and for a structure according to one embodiment, as shown in FIG. 7B. Referring again to FIG. 9, it is clear that, although the current density increases in the conventional structure in the region in proximity of the position of the main pole edge portion, it decreases in regions on the outer side therefrom. The reason for this resides in the fact that, in the conventional structure, current is supplied from the main pole alone and, accordingly, when an STO of larger width than the main pole is employed, current is not supplied to the device edge portion positioned on the outer side from the main pole. On the other hand, in the structure according to one embodiment, it is clear that the current density increases in the device edge portion with respect to the device center portion.

Figure 10:
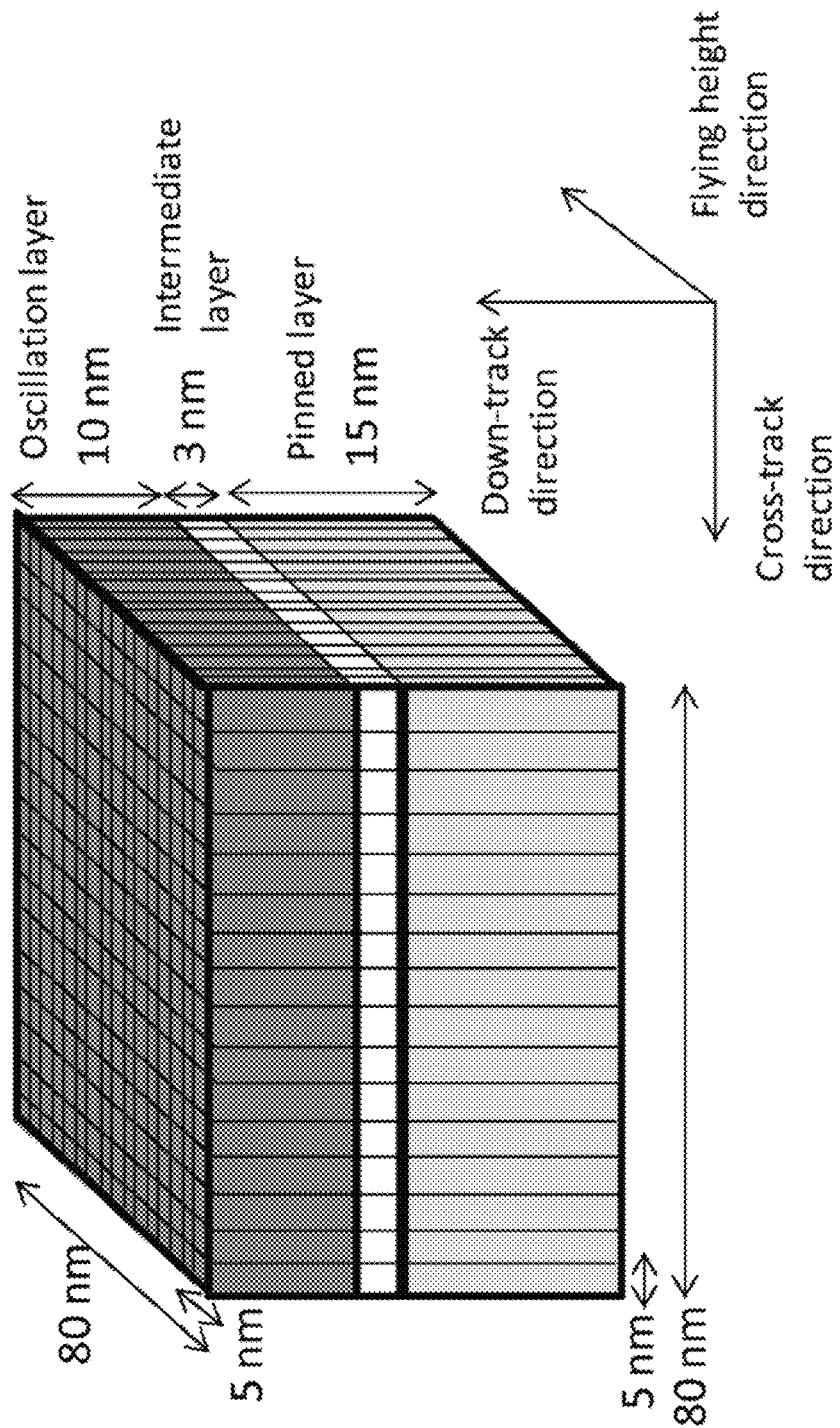
FIG. 10 shows a model used in a Landau-Lifshitz-Gilbert (LLG) micromagnetic analysis.

The effects of this current distribution on the oscillation characteristics is now described. The oscillation characteristics were examined by micromagnetic simulation using the LLG equation. FIG. 10 shows a schematic diagram of a model thereof. The model comprises an oscillation layer, intermediate layer, and a pinned layer. The length of each layer in the down-track direction is 10 nm, 3 nm, and 15 nm, respectively. A length of 80 nm is maintained in the cross-track direction and in the flying height direction, and the model defines a 5 nm mesh interval. Table 2, below, lists the material constants of each layer.

TABLE 2

| Property | Unit | Pinned Layer (111) | Intermediate Layer (112) | Oscillation Layer (113) |
|---|---|---|---|---|
| Magnetization | emu/cc | 796 | 0 | 796 |
| Anisotropy field | Oe | $1.5 \times 10^4$ | 0 | $-2.5 \times 10^4$ |
| Uniaxial anisotropy constant (Ku2) | erg/cc | $6 \times 10^6$ | 0 | $-1 \times 10^7$ |
| Resistivity | $\Omega \cdot cm$ | $3 \times 10^{-5}$ | $1 \times 10^{-5}$ | $3 \times 10^{-5}$ |
| Spin polarization | — | 0.4 | 0 | 0.5 |
| Thickness | nm | 15 | 3 | 10 |

The oscillation stability and oscillation frequency were examined under conditions in which the applied electric current and external magnetic field in the down-track direction of the device were changed between 2 kOe and 13 kOe and 0 mA and 250 mA, respectively. The current distributions, which are normalized at the maximum intensity at this time, are equivalent to the normalized current distributions determined by the electric current FEM calculation. In addition, the current distribution in the flying height direction of the STO is assumed to be uniform. The index for the evaluation of the oscillation stability is defined as a single domain ratio (SDR). This involves the normalization of the maximum value Mmax of the average magnetization quantity M(t) of the vibrating device as a whole at a saturated magnetization amount Ms against the time axis. That is to say, taking the magnetization vector of each spin as m(t), $M(t) = |\Sigma mz(t)|$, Mmax denotes the maximum value of a time constant M(t). If the differential motion phase remains the same between spins, Mmax/Ms=1. This means that the orientation of all spins is always the same, and that a single domain is formed. When a discrepancy occurs in the uniformity of the differential motion during a spin and results in a phase difference in the differential motion between spins, Mmax/Ms<1. At this time, a localized eddy-like domain structure forms within the device, the oscillation is rendered unstable, and the intensity of the high-frequency magnetic field is lowered. In this model, sixteen cells are provided in the cross-track direction and the down-track direction, and the SDR is defined by the sum of the magnetization vectors of a total of 256 spins.

Figure 11A:
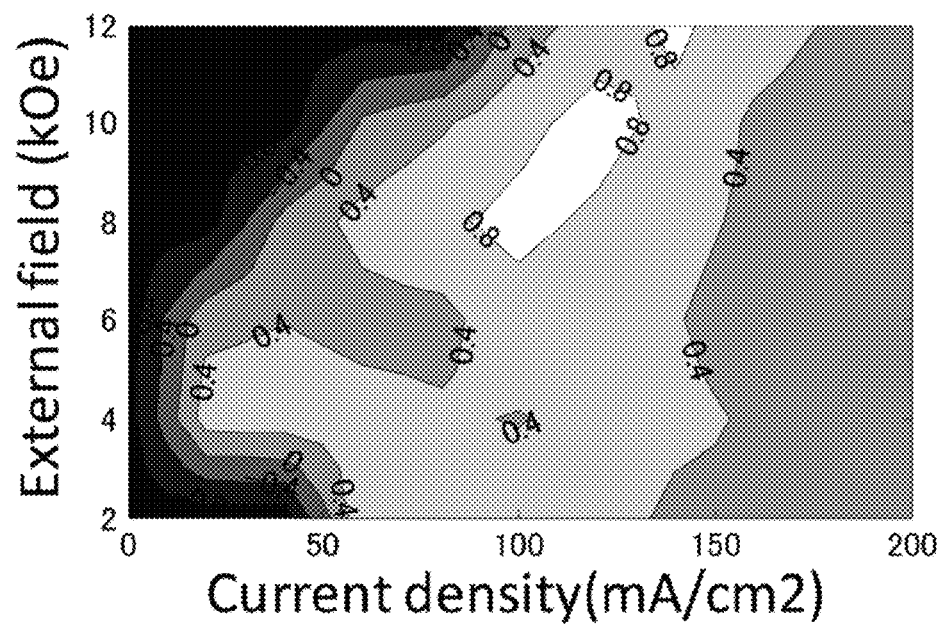
FIG. 11A shows the dependency of the single domain ratio on the external magnetic field and applied current of a conventional structure.
Figure 11B:
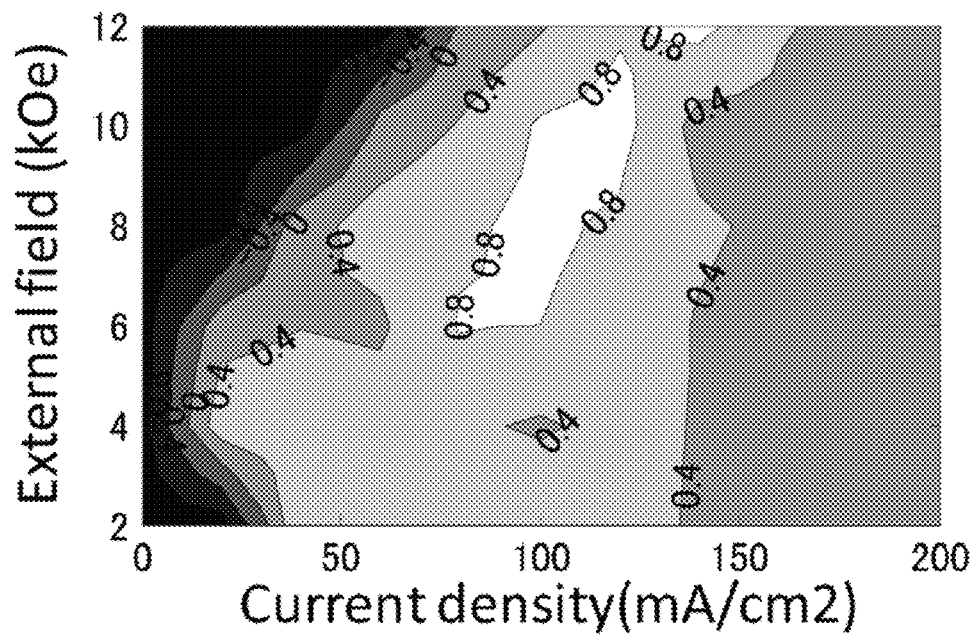
FIG. 11B shows the dependency of the single domain ratio on the external magnetic field and applied current of a structure according to one embodiment.

FIG. 11A shows the SDR when the external magnetic field and current density dependency are changed for a conventional structure as shown in FIG. 7A, while FIG. 11B shows the results for a structure according to one embodiment as shown in FIG. 7B. Referring again to FIGS. 11A-11B, it is clear that the region indicating a high SDR is greater in the structure according to one embodiment than in the conventional structure.

Figure 12:
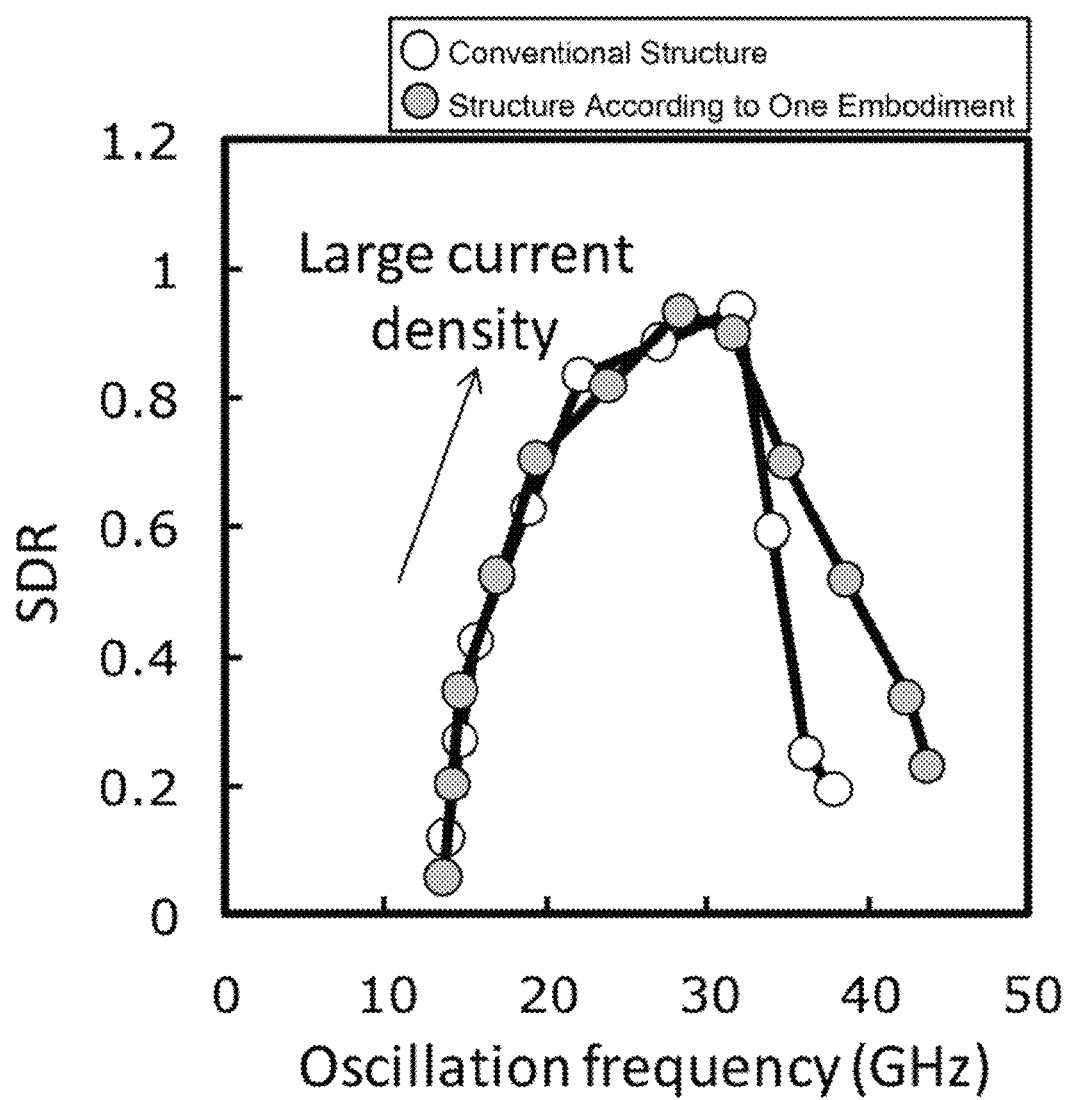
FIG. 12 shows a relationship between the oscillation frequency and the single domain ratio where the external magnetic field is taken as 10 kOe.

FIG. 12 shows a relationship between the SDR and oscillation frequency when, in an external magnetic field of 10 kOe, the applied electric current is changed. In contrast to a conventional structure in which the single domain ratio drops rapidly at about 30 GHz and above, this drop occurs more gradually in the structure according to one embodiment. Accordingly, the structure according to one embodiment affords the production of a STO of higher oscillation frequency and more stable oscillation, both beneficial in the art of magnetic recording.

The following calculations were performed for the purpose of better understanding these results. The difference between the structure according to one embodiment and the conventional structure resides in the current distribution at the STO edge portion. Thereupon, two kinds of calculations pertaining to a case involving the application of an electric current to the center portion only of the STO and the application of an electric current to the edge portion only of the STO were performed, and the oscillation stabilities were compared.

Figure 13A:
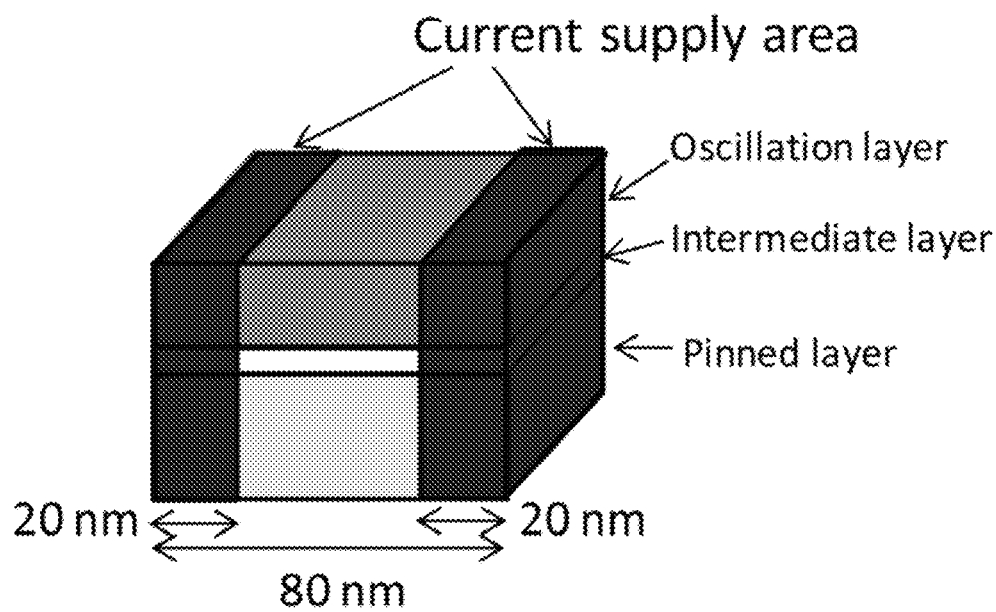
FIGS. 13A-13B show a region in which current is applied to the STO, according to various embodiments.
Figure 13B:
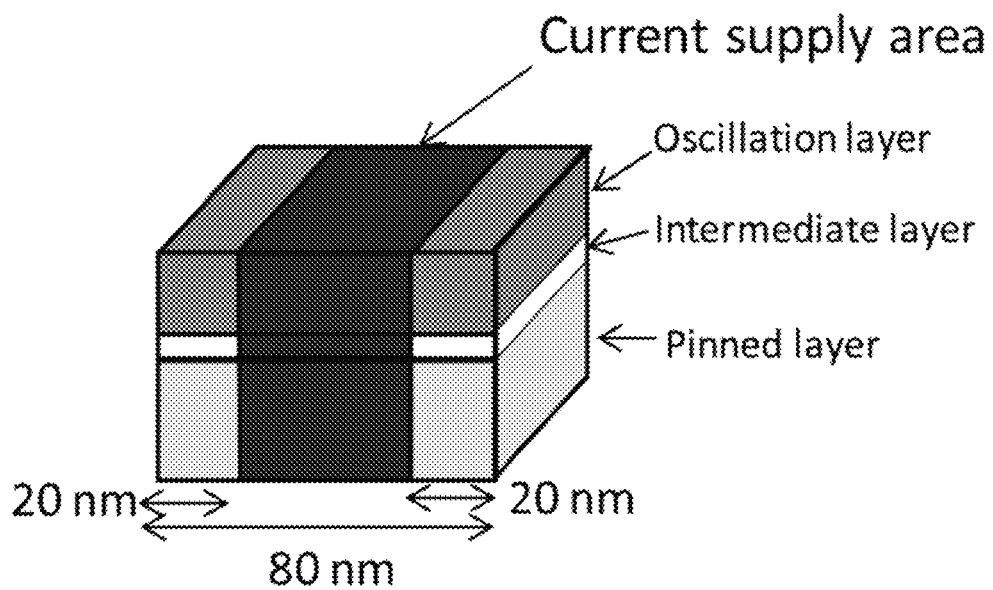

FIGS. 13A-13B show schematic diagrams of the models thereof. While these STO models are similar to those which have been hitherto considered, in contrast to the model shown in FIG. 13A (model A) in which the electric current has been applied only to the STO center portion (20 nm to both sides from the track center portion), in the model shown in FIG. 13B (model B), the electric current has been applied only to the edge portion (20 nm from each of both sides of the track edge portions).

Figure 14A:
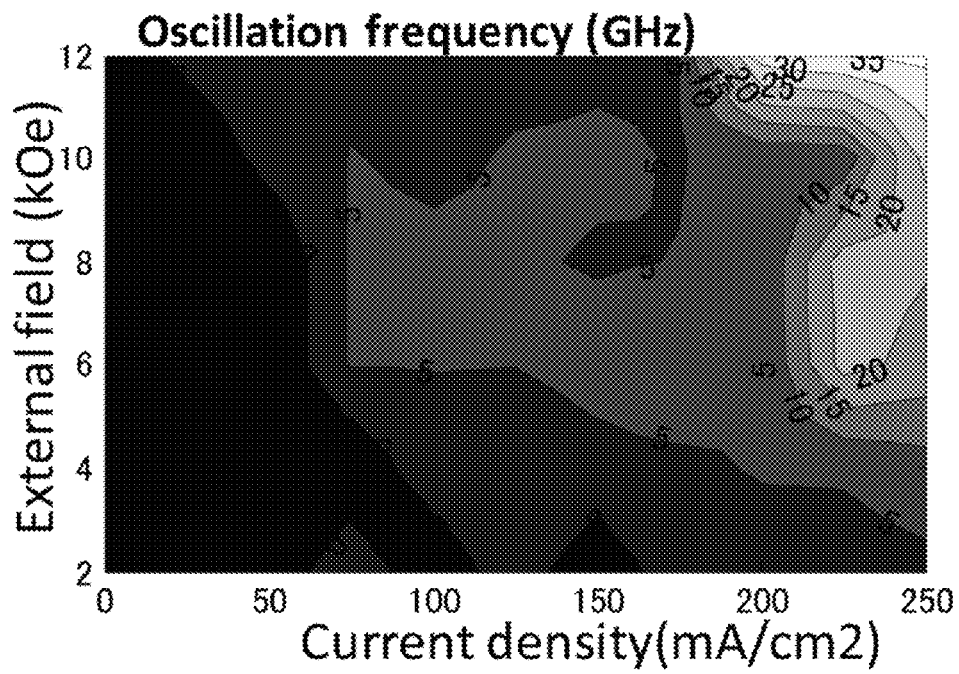
FIG. 14A shows the dependency of the oscillation frequency on the external magnetic field and the applied current of a conventional structure.
Figure 14B:
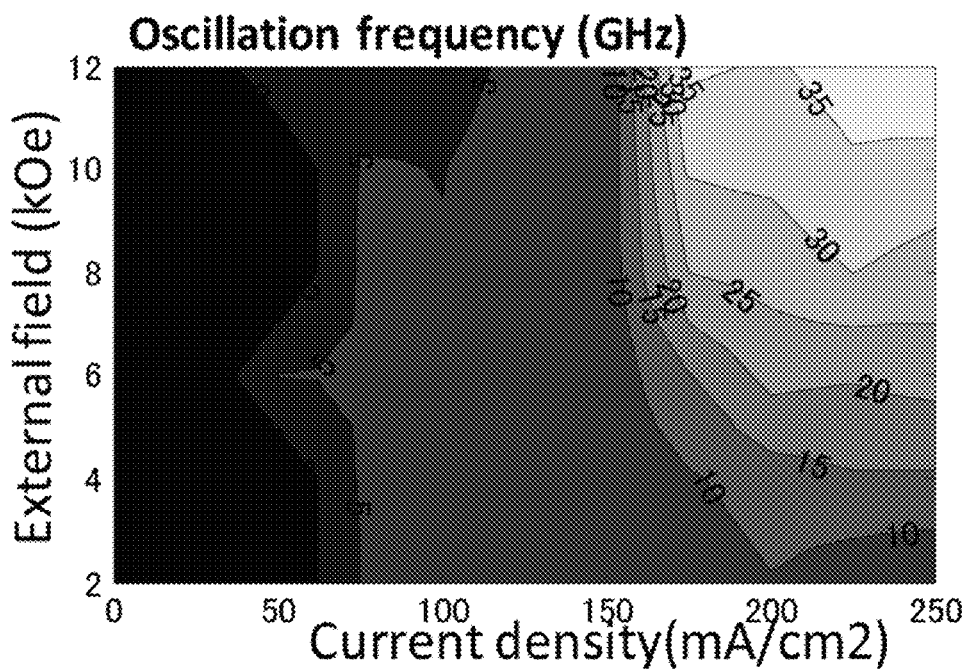
FIG. 14B shows the dependency of the oscillation frequency on the external magnetic field and the applied current of a structure according to one embodiment.
Figure 15A:
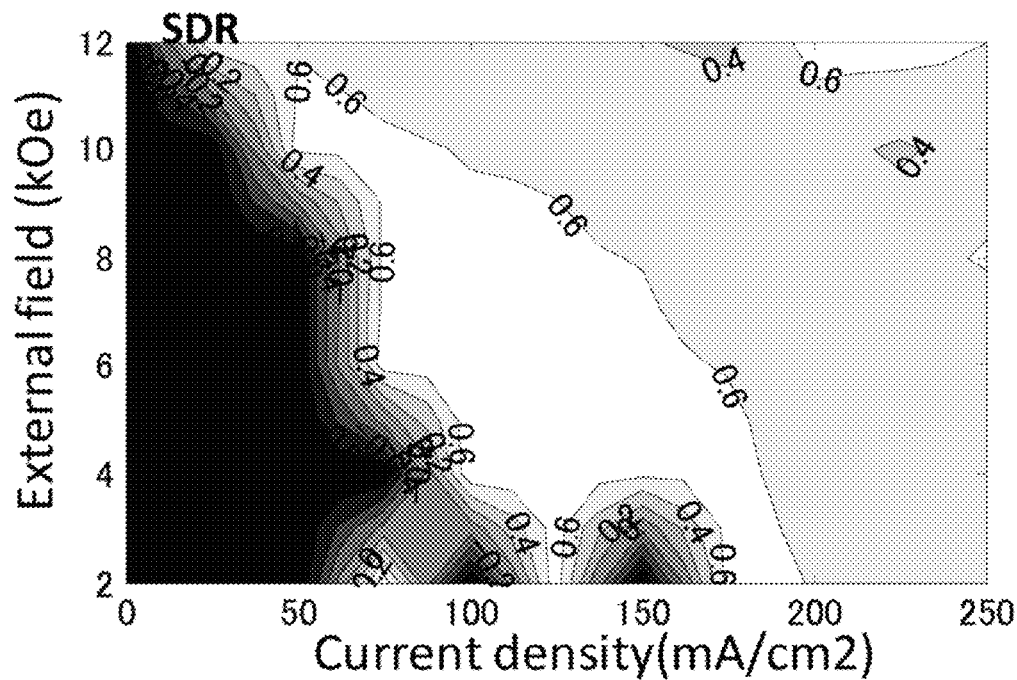
FIG. 15A shows the dependency of the single domain ratio on the external magnetic field and the applied current of a conventional structure.
Figure 15B:
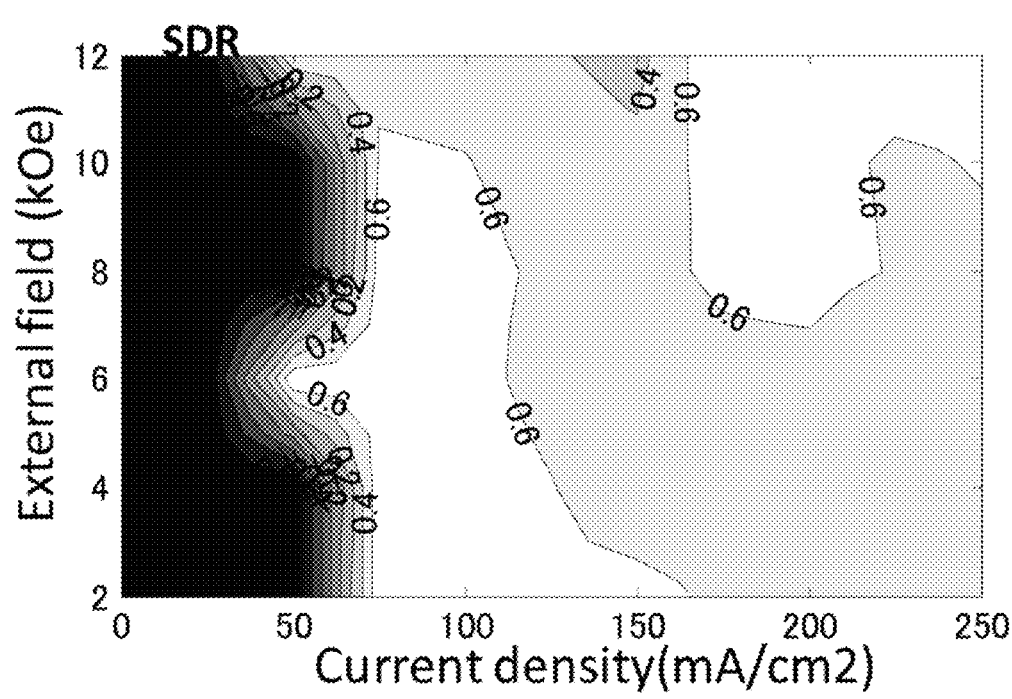
FIG. 15B shows the dependency of the single domain ratio on the external magnetic field and the applied current of a structure according to one embodiment.

FIG. 14A shows the oscillation frequency and FIG. 15A shows the SDR when the external magnetic field and current density are changed for model A, while FIG. 14B shows the oscillation frequency and FIG. 15B shows the SDR when the external magnetic field and current density are changed for model B. In a comparison made using the same external magnetic field and applied electric current, it is clear that a higher oscillation frequency is produced by model B than model A, and that the SDR thereof also tends to be greater. These results indicate that the current density at the edge portion has a significantly greater impact on the oscillation characteristics than the current density at the device center portion. From the standpoint of promoting a stable high-frequency oscillation, this suggests it is useful to impart an adequate spin torque to the magnetization of the end portions of the device which are heavily affected by the reversing magnetic field which is dependent upon the exterior shape of the device. Based on these results, the structure according to one embodiment may be regarded as the reason why, compared to a conventional structure, the concentration of the current density in the device edge portions of the STO affords a more stable and higher frequency oscillation.

Figure 16:
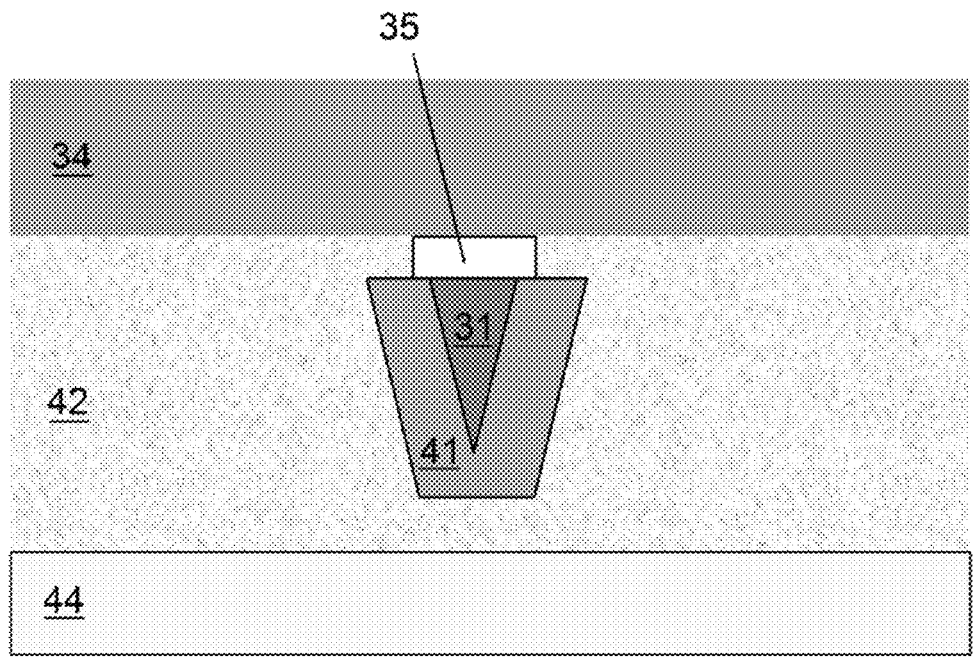
FIG. 16 shows an ABS view of a magnetic structure, according to a first embodiment.

The same effects are able to be achieved with a structure like that shown in FIG. 16, according to a first embodiment, that does not comprise a side shield. In this case, the non-magnetic material of the metal body or the insulating material comprising, for example, $Al_2O_3$, NiCr, etc., is able to be employed as the peripheral portion material of the insulating body-side gap 41.

In this embodiment, a MAMR head may comprise a main pole 31 comprising a magnetic body adapted to generate a magnetic field for recording data on a magnetic recording medium, a trailing shield 34 positioned downstream from the main pole 31 in a direction in which the magnetic recording medium advances, an oscillation device 35 adapted to generate a high-frequency magnetic field, the oscillation device 35 being positioned between the main pole 31 and the trailing shield 34, a circuit (not shown) adapted to flow an electric current therethrough to the main pole 31, the oscillation device 35, and the trailing shield 34, an electrically conductive non-magnetic body 41 positioned on one or more sides of the main pole 31 in a cross-track direction and/or a leading direction, and an insulating non-magnetic body 42 positioned on one or more sides of the electrically conductive non-magnetic body 41 in the cross-track direction and/or the leading direction. One or more edge portions of one side of the oscillation device 35 and one or more edge portions of one side of the main pole 31 are in direct contact with the electrically conductive non-magnetic body 41. The oscillation device 35 may comprise a STO, in some approaches.

The MAMR head may also comprise a leading shield 44, in some approaches.

In another embodiment, the electrically conductive non-magnetic body 41 may be positioned on both sides of the main pole 31 in the cross-track direction and on a side of the main pole 31 in the leading direction, e.g., it surrounds the main pole 31 on three sides. In a further embodiment, the insulating non-magnetic body 42 may be positioned on both sides of the electrically conductive non-magnetic body 41 in the cross-track direction and on a side of the electrically conductive non-magnetic body 41 in the leading direction.

According to another embodiment, edge portions of the one side of the oscillation device 35, other than the one or more edge portions in direct contact with the electrically conductive non-magnetic body 41, may be in direct contact with the main pole 31.

Figure 17:
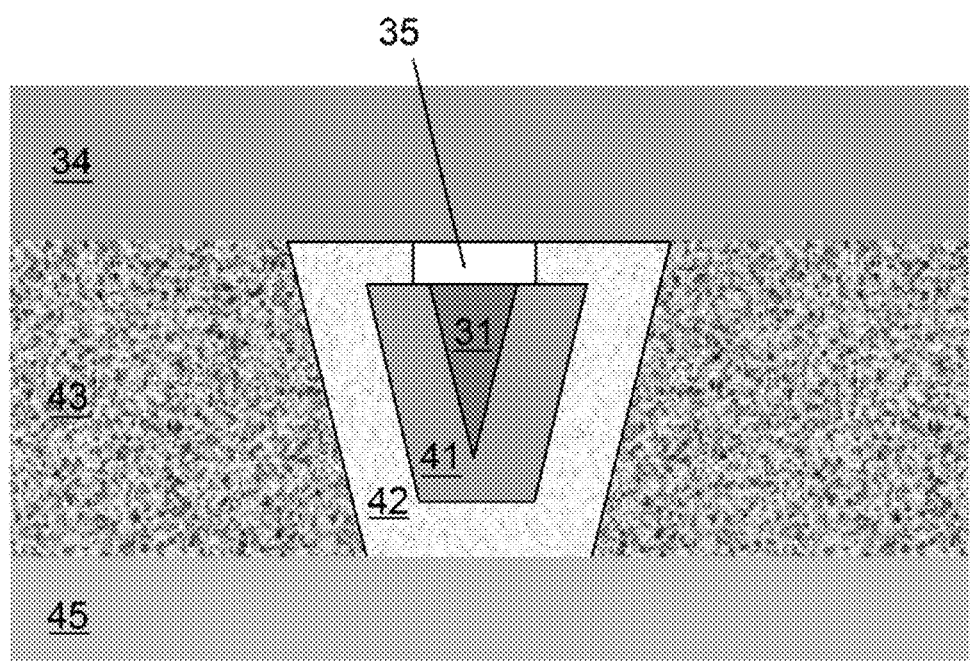
FIG. 17 shows an ABS view of a magnetic structure, according to a second embodiment.
Figure 18:
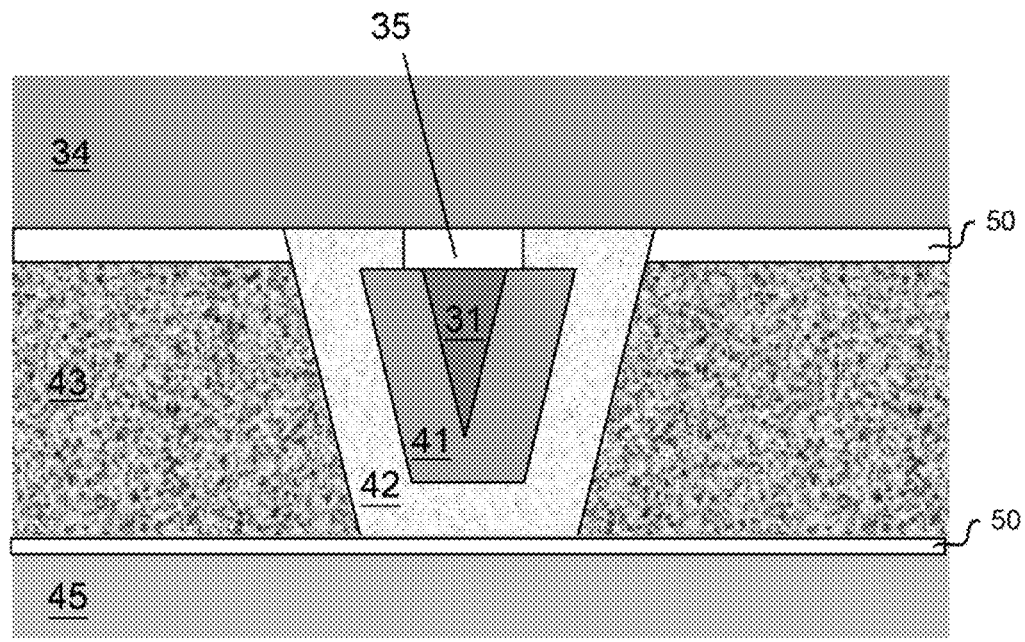
FIG. 18 shows an ABS view of a magnetic structure, according to a third embodiment.

The same effects are able to be achieved using a main pole of a structure like that shown in FIG. 17, according to a second embodiment, that comprises a shield (leading shield) 45 on the main pole 31 leading side. There are no restrictions to the effects of these structures caused by which material is employed for the trailing shield 34, side shield 43, and leading shield 45, or by the shapes thereof. The space between one shield and another shield may be magnetically or electrically insulated. By way of example, as shown in FIG. 18, according to a third embodiment, the same effects are able to be produced by the provision of a laminar non-magnetic body 50 between the trailing shield 34 and the side shield 43, and/or between the side shield 43 and the leading shield 45.

Figure 19:
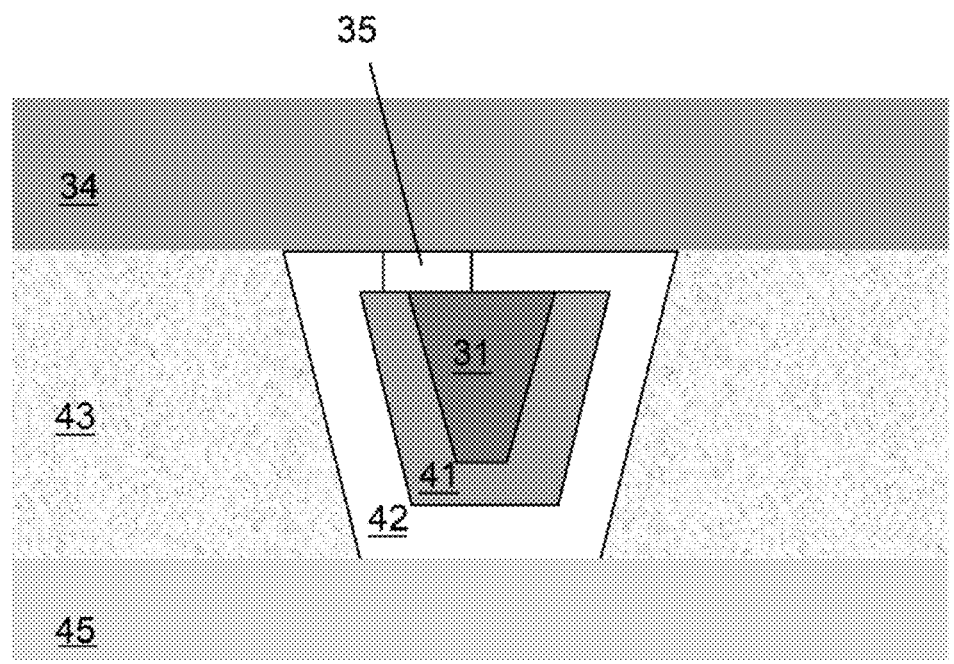
FIG. 19 shows an ABS view of a magnetic structure, according to a fourth embodiment.

In addition, the same effects are able to be produced even in a structure in which only the edge portion in one side of the oscillation device or STO 35 in the cross-track direction is positioned on the outside of the main pole 31. By way of example, in a shingled-magnetic recording (SMR)-type head employed for recording with only one side of a magnetic pole, only the region related to recording is able to be effectively assisted by the arrangement of the edge portion of the STO 35 on the side thereof employed for recording on the outer side of the main pole 31, as shown in a fourth embodiment in FIG. 19.

Figure 20:
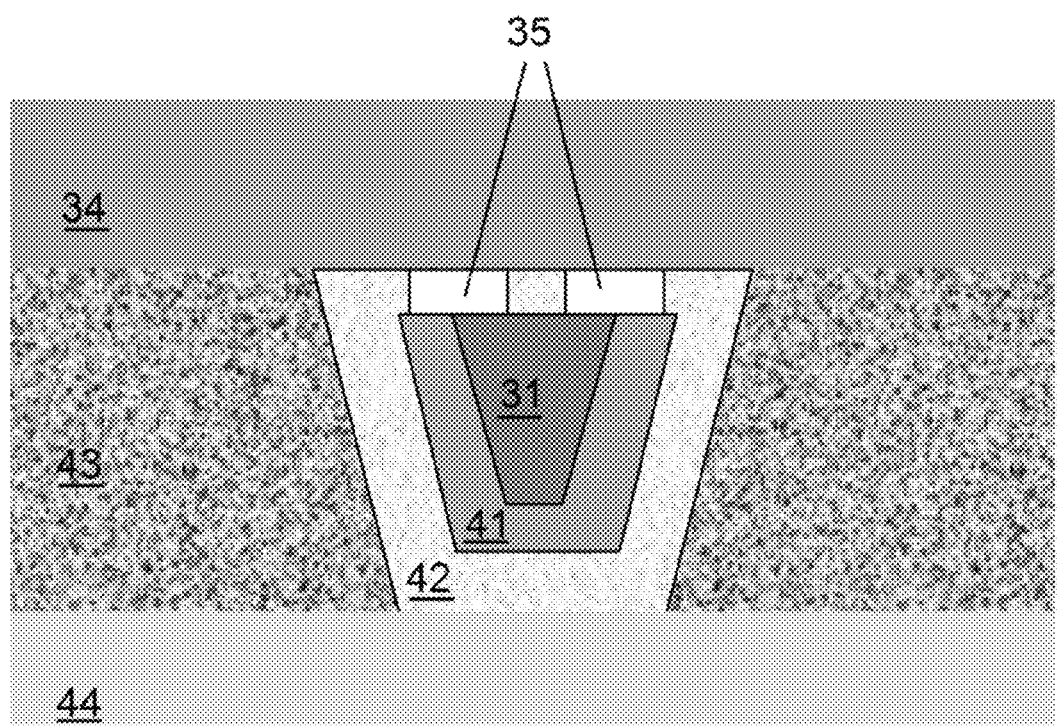
FIG. 20 shows an ABS view of a magnetic structure, according to a fifth embodiment.

In addition, an oscillation device or STO 35 may be provided on both sides of the edge portions of the main pole 31, and the magnetic pole positions for recording at both sides on the inner circumference and outer circumference of the recording disk may be used, as shown in a fifth embodiment in FIG. 20.

This is advantageous in that, compared to when a single STO of large cross-track direction width is employed, the size of the devices is smaller and, accordingly, a more stable oscillation is able to be produced. In this embodiment, a second oscillation device 35 may be included, the two oscillation devices 35 being positioned in direct contact with two edge portions of one side of the main pole 31 (a trailing edge), the two edge portions being separated in the cross-track direction by an insulating material 42 therebetween in direct contact with the main pole 31. In a further embodiment, the two oscillation devices 35 may be also in direct contact with the electrically conductive non-magnetic body 41 at outer sides thereof from a center of the main pole 31 in the track-width direction.

Any MAMR head described herein according to any embodiment may be included in a magnetic data storage system, which may include a magnetic medium, a drive mechanism for passing the magnetic medium over the at least one MAMR head; and a controller electrically coupled to the at least one MAMR head for controlling operation of the at least one MAMR head. For example, a magnetic data storage system or disk drive such as that shown in FIG. 1 may be used.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A microwave-assisted magnetic recording (MAMR) head, comprising:
   a main pole comprising a magnetic body configured to generate a magnetic field for recording data on a magnetic recording medium;
   a trailing shield positioned downstream from the main pole in a direction in which the magnetic recording medium advances;
   two oscillation devices, each oscillation device being configured to generate a high-frequency magnetic field, the oscillation devices being positioned between the main pole and the trailing shield;

a circuit configured to flow an electric current therethrough to the main pole, the oscillation devices, and the trailing shield;

an electrically conductive non-magnetic body positioned on one or more sides of the main pole in a cross-track direction and/or a leading direction; and an insulating non-magnetic body positioned on one or more sides of the electrically conductive non-magnetic body in the cross-track direction and/or the leading direction, wherein one or more edge portions of one side of each of the oscillation devices and one or more edge portions of one side of the main pole are in direct contact with the electrically conductive non-magnetic body, and wherein all edge portions of the one side of each of the oscillation devices are in direct contact with one of: the main pole and the electrically conductive non-magnetic body.

2. The MAMR head as recited in claim 1, wherein the electrically conductive non-magnetic body is positioned on both sides of the main pole in the cross-track direction and on a side of the main pole in the leading direction.

3. The MAMR head as recited in claim 2, wherein the insulating non-magnetic body is positioned on both sides of the electrically conductive non-magnetic body in the cross-track direction and on a side of the electrically conductive non-magnetic body in the leading direction.

4. The MAMR head as recited in claim 1, wherein each of the oscillation devices comprises a spin torque oscillator (STO).

5. The MAMR head as recited in claim 1, wherein the two oscillation devices are positioned in direct contact with two edge portions of one side of the main pole, the two edge portions being separated in the cross-track direction by an insulating material therebetween in direct contact with the main pole.

6. The MAMR head as recited in claim 5, wherein the two oscillation devices are also in direct contact with the electrically conductive non-magnetic body at outer sides thereof from a center of the main pole in the track-width direction.

7. A magnetic data storage system, comprising:
at least one MAMR head as recited in claim 1;
a magnetic medium;
a drive mechanism for passing the magnetic medium over the at least one MAMR head; and
a controller electrically coupled to the at least one MAMR head for controlling operation of the at least one MAMR head.

8. A microwave-assisted magnetic recording (MAMR) head, comprising:
a main pole configured to generate a magnetic field for recording data on a magnetic recording medium;
a trailing shield positioned downstream from the main pole in a direction in which the magnetic recording medium advances;
two spin torque oscillators (STOs), each STO being configured to generate a high-frequency magnetic field, the STOs being positioned between the main pole and the trailing shield;
an electrically conductive non-magnetic body positioned on one or more sides of the main pole in a cross-track direction and/or a leading direction; and
an insulating non-magnetic body positioned on one or more sides of the electrically conductive non-magnetic body in the cross-track direction and/or the leading direction,
wherein one or more edge portions of one side of each of the STOs and one or more edge portions of one side of the main pole are in direct contact with the electrically conductive non-magnetic body, and
wherein all edge portions of the one side of each of the STOs are in direct contact with at least one of: the main pole and the electrically conductive non-magnetic body.

9. The MAMR head as recited in claim 8, wherein the electrically conductive non-magnetic body is positioned on both sides of the main pole in the cross-track direction and on a side of the main pole in the leading direction, wherein the insulating non-magnetic body is positioned on both sides of the electrically conductive non-magnetic body in the cross-track direction and on a side of the electrically conductive non-magnetic body in the leading direction.

10. The MAMR head as recited in claim 8, wherein the main pole has two trailing corners and each of the STOs is positioned in direct contact with only one of the trailing corners of the main pole and not in direct contact with the other trailing corner of the main pole.

11. The MAMR head as recited in claim 8, wherein the two STOs are positioned in direct contact with two edge portions of one side of the main pole, the two edge portions being separated in the cross-track direction by an insulating material therebetween in direct contact with the main pole.

12. The MAMR head as recited in claim 11, wherein the two STOs are also in direct contact with the electrically conductive non-magnetic body at outer sides thereof from a center of the main pole in the track-width direction.

13. A magnetic data storage system, comprising:
at least one MAMR head as recited in claim 8;
a magnetic medium;
a drive mechanism for passing the magnetic medium over the at least one MAMR head; and
a controller electrically coupled to the at least one MAMR head for controlling operation of the at least one MAMR head.

* * * * *

UNITED STATES PATENT AND TRADEMARK OFFICE
CERTIFICATE OF CORRECTION

| | | |
|---|---|---|
| PATENT NO. | : 8,988,826 B2 | Page 1 of 1 |
| APPLICATION NO. | : 13/723010 | |
| DATED | : March 24, 2015 | |
| INVENTOR(S) | : Mikito Sugiyama et al. | |

It is certified that error appears in the above-identified patent and that said Letters Patent is hereby corrected as shown below:

In the specification:

col. 1, line 44 replace "benefited" with --benefitted--;

col. 5, line 36 replace "e.g." with --e.g.,--;

col. 8, line 2 replace "heater (heater)" with --heater (Heater)--.

Signed and Sealed this
Fifteenth Day of September, 2015

Michelle K. Lee
*Director of the United States Patent and Trademark Office*